(12) United States Patent
Wang (10) Patent No.: US 9,387,738 B2
(45) Date of Patent: Jul. 12, 2016

(54) ATTACHMENT FOR AIR VALVE (71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun Taichung (TW)

( * ) Notice: Subject to any disclaimer, the term of this patent is extended or adjusted under 35 U.S.C. 154(b) by 154 days.

(21) Appl. No.: 14/265,551

(22) Filed: Apr. 30, 2014

(65) Prior Publication Data
US 2015/0316160 A1 Nov. 5, 2015

(51) Int. Cl.
*F16K 15/20* (2006.01)
*B60C 29/06* (2006.01)

(52) U.S. Cl.
CPC ............ *B60C 29/064* (2013.04); *F16K 15/20* (2013.01); *Y10T 137/3724* (2015.04)

(58) Field of Classification Search
CPC .................. Y10T 137/3584; Y10T 137/3724; B60C 29/06; B60S 5/04
See application file for complete search history.

(56) References Cited

U.S. PATENT DOCUMENTS

| | | | | |
|---|---|---|---|---|
| 3,738,688 A * | 6/1973 | Racine | F16L 37/05 285/179 |
| 3,923,325 A * | 12/1975 | Slater, Jr. | F16L 37/18 137/223 |
| 5,645,100 A | 7/1997 | Chuang et al. | |
| 5,683,234 A | 11/1997 | Chuang et al. | |
| 6,105,601 A * | 8/2000 | Wang | B60S 5/04 137/231 |
| 6,289,920 B1 * | 9/2001 | Wang | B60S 5/04 137/223 |
| 7,866,335 B2 | 1/2011 | Wang | |
| 2008/0236675 A1 * | 10/2008 | Wang | F16K 15/20 137/231 |
| 2014/0261754 A1 * | 9/2014 | Wang | F04B 33/005 137/231 |
| 2015/0053280 A1 * | 2/2015 | Wang | F16L 37/28 137/231 |
| 2015/0316160 A1 * | 11/2015 | Wang | F16K 15/20 141/383 |

* cited by examiner

*Primary Examiner* — R. K. Arundale
(74) *Attorney, Agent, or Firm* — Charles E. Baxley (57) ABSTRACT

An air valve connecting device or attachment includes a housing having a tilted inner peripheral surface, a sliding member slidably engaged in the housing and having a pathway for receiving a pressurized air, a gripping device having two casing members slidably engaged with the tilted inner peripheral surface of the housing and having a passage formed in the casing members, and an inflation valve engageable into the passage of the casing members for moving the casing members into the housing and for allowing the casing members to be forced toward each other with the tilted inner peripheral surface of the housing and in order to grasp the inflation valve with the casing members.

9 Claims, 6 Drawing Sheets

ATTACHMENT FOR AIR VALVE

BACKGROUND OF THE INVENTION

1. Field of the Invention

The present invention relates to an air valve connecting head or device or attachment, and more particularly to an air valve connecting device or attachment including an improved structure for easily and quickly connecting to an inflation valve by the user and for preventing an air leaking from the inflation valve and the attachment.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles.

For example, U.S. Pat. No. 5,683,234 to Chuang et al., and U.S. Pat. No. 5,645,100 to Chuang et al. disclose two of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings comprise a structure that may occupy a great space or volume and that may not be easily operated or may not effectively grasping or holding the different inflation valves, and may have an air leaking problem occurred through either the inflation valve or the attachment.

U.S. Pat. No. 7,866,335 to Wang discloses another typical air valve connecting heads for the hand-held air pump and comprising a fitting device or attachment for selectively or alternatively engaging with different tire valves, such as the U.S. type inflation valve or the French type inflation valve, or the like.

However, the typical air valve connecting heads or attachments also comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to an inflation valve by the user and for preventing an air leaking from the inflation valves and the attachment.

In accordance with one aspect of the invention, there is provided an air valve connecting device comprising a housing including a compartment formed therein, and including an entrance formed therein and communicating with the compartment of the housing for receiving a pressurized air, and including a tilted inner peripheral surface formed in a lower portion of the housing, a sliding member slidably received and engaged in the compartment of the housing, and including an upper portion extendible out of the housing, the sliding member including a pathway formed therein and communicating with the entrance of the housing for receiving the pressurized air from the entrance of the housing, the sliding member including a lower portion, a gripping device including a casing having two casing members moved in concert with the sliding member and slidably engaged with the tilted inner peripheral surface in the lower portion of the housing, the casing including a passage formed in the casing members, and an inflation valve engageable into the passage of the casing members of the casing for selectively moving the casing into the compartment of the housing and for allowing the casing members of the casing to be forced toward each other with the tilted inner peripheral surface of the housing.

The gripping device includes a shaft extended from one of the casing members and pivotally engaged with the other casing member for pivotally coupling the casing members of the casing together. The gripping device includes a depression formed in other casing member for engaging with the shaft.

The housing includes a hole formed through the housing and communicating with the compartment of the housing, and a latch member engaged in the hole of the housing for engaging with the casing and for anchoring and securing the casing to the housing. One of the casing members includes a first notch and a second notch formed therein and directed toward the hole of the housing for selectively engaging with the latch member.

The casing members of the casing each include a resilient outer peripheral wall for increasing a resilience of the casing members of the casing. The sliding member includes a tube provided in the lower portion of the sliding member and engaged into the passage of the casing for anchoring the casing to the sliding member. A sealing ring is engaged between the tube of the sliding member and the casing.

The housing includes an orifice and an inner peripheral shoulder formed in the upper portion of the housing and communicating with the compartment of the housing, and the sliding member includes an upper portion extendible out through the orifice of the housing.

The housing includes a spring biasing member disposed in the compartment of the housing and engaged between the sliding member and the housing for biasing and moving the sliding member outwardly toward the lower portion of the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-7, an air valve connecting device or attachment in accordance with the present invention comprises a head body or outer housing 10 including a compartment 11 formed therein and opened upwardly through an upper portion 12 of the housing 10 and also opened downwardly through a lower or bottom portion 13 of the housing 10 (FIGS. 3-7), the housing 10 includes a positioning or retaining or anchoring portion or device or member 14 extended radially and inwardly therefrom, such as extended radially and inwardly from the upper portion 12 of the housing 10 for forming or defining a relatively decreased or reduced entrance or passage or orifice 15 and/or an inner peripheral depression or recess or shoulder 16 in the upper portion 12 of the housing 10 and communicating with the compartment 11 of the housing 10.

The housing 10 further includes a stud or extension or inlet barrel or handle 17 extended laterally and outwardly therefrom for connecting or coupling to a pressurized air reservoir or hand-held air pump (not illustrated) or the like with such as hoses (not illustrated) and/or a control ferrule 20 or the like for receiving the pressurized air from the air reservoir or hand-held air pump (not illustrated) or the like, and includes a lateral orifice or entrance 18 formed therein, such as formed in or through the handle 17 of the housing 10 and communicating with the compartment 11 of the housing 10 for guiding the pressurized air to flow into the compartment 11 of the housing 10. The above-described structure or configuration for the connection mechanism or status between the handle 17 and the air reservoir or hand-held air pump (not illustrated) is typical and is not related to the present invention and will not be described in further details.

Figure 7:
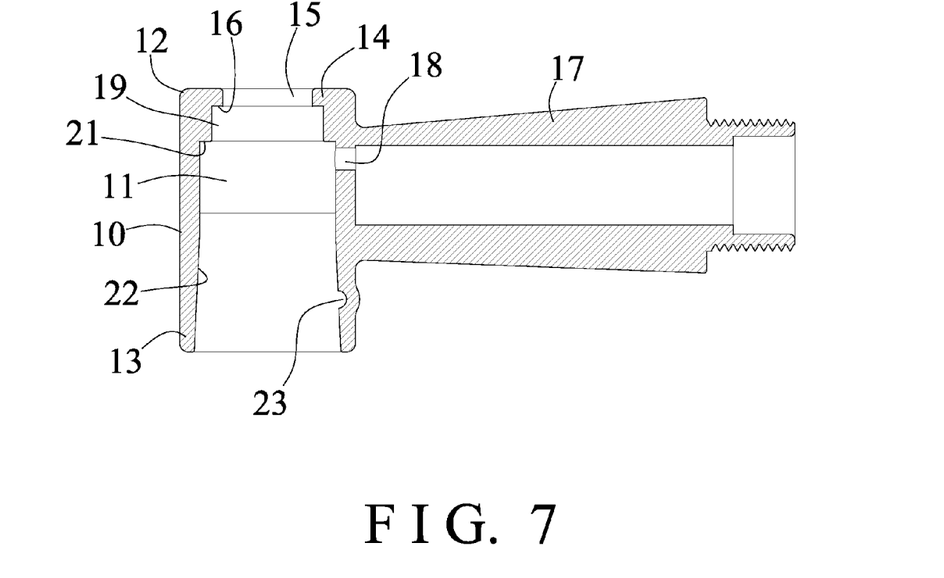
FIG. 7 is a further cross sectional view of the air valve connecting device or attachment taken along lines 7-7 of FIG. 6.

The housing 10 further includes a space 19 also formed in the upper portion 12 of the housing 10 and communicating with the compartment 11 and the orifice 15 of the housing 10, and disposed or located between the compartment 11 and the orifice 15 of the housing 10, and the space 19 of the housing 10 includes an inner diameter smaller than that of the compartment 11 of the housing 10 for forming or defining another inner peripheral depression or recess or shoulder 21 in the upper portion 12 of the housing 10 and between the compartment 11 and the space 19 of the housing 10, best shown in FIG. 7. The housing 10 further includes a tilted or inclined inner peripheral portion or surface 22 formed or provided in the lower portion 13 of the housing 10, and includes a lateral orifice or through hole 23 laterally formed through the lower portion 13 of the housing 10 and communicating with the compartment 11 of the housing 10, best shown in FIGS. 1-2 and 6-7, for receiving or engaging with a latch pin or member 25. The inner peripheral surface 22 and/or the lower portion 13 of the compartment 11 of the housing 10 includes a non-circular cross section (FIG. 6), such as a square or rectangular cross section.

The air valve connecting device or attachment further includes a valve piece or shank or sliding member 30 slidably or movably disposed or engaged into the compartment 11 of the housing 10 and movable up and down along the compartment 11 of the housing 10, and the sliding member 30 includes an upper portion 31 selectively extendible out of the housing 10 (FIGS. 3, 5), and includes another positioning or retaining or anchoring portion or device or member 32, such as an outer peripheral shoulder 32 formed therein (FIG. 1), such as formed in the upper portion 31 of the sliding member 30 for selectively contacting or engaging with the anchoring member 14 and/or the inner peripheral shoulder 16 of the housing 10 and for guiding and limiting the sliding member 30 to slide or move relative to the housing 10 and for preventing the sliding member 30 from being disengaged or removed or separated from the housing 10 inadvertently.

The sliding member 30 includes a passage or orifice or opening or conduit or pathway 33 laterally formed in the middle or intermediate portion 34 of the sliding member 30 for selectively aligning with or engaging with or communicating with the entrance 18 of the handle 17, best shown in FIGS. 3-5 and 8-9, and for selectively receiving the pressurized air from the air reservoir or hand-held air pump (not illustrated) or the like; and includes an opening or mouth 35 formed therein, such as formed in the lower portion 36 of the sliding member 30 and communicating with the pathway 33 of the sliding member 30 for allowing the pressurized air to selectively flow from the pathway 33 to the mouth 35 of the sliding member 30 (FIGS. 3, 5) and then to flow out of the sliding member 30 selectively; and includes a relatively decreased or reduced ring or conduit or cylindrical member or tube 37 formed or provided in the lower portion 36 of the sliding member 30. The mouth 35 is formed through the lower portion 36 and the tube 37 of the sliding member 30 for receiving or engaging with an inflation valve 90 (FIG. 4), such as the U.S. type valve or the French type or first inflation valve 90 or the like.

The air valve connecting device or attachment further includes one or more (such as three) sealing rings 38, 39, 40 attached or mounted or secured or engaged onto the sliding member 30, and contacted or engaged between the sliding member 30 and the housing 10 for selectively making a water or air tight seal between the sliding member 30 and the housing 10, for example, one of the sealing rings 38 is disposed or located above the pathway 33 of the sliding member 30 and engageable with the anchoring member or outer peripheral shoulder 32 of the sliding member 30 and the anchoring member 14 and/or the inner peripheral shoulder 16 of the housing 10, and another sealing ring 39 is disposed or located below the pathway 33 of the sliding member 30 and attached or engaged onto the sliding member 30, and a further sealing ring 40 is disposed or engaged onto or around the tube 37 of the sliding member 30. A spring biasing member 41 is disposed or engaged between the sliding member 30 and the housing 10 for biasing and forcing or moving the sliding member 30 outwardly and downwardly toward the lower portion 13 of the housing 10.

An anchoring or retaining or chuck or grasping or catching or gripping element or device 5 is slidably or movably disposed or engaged in the lower portion 13 of the compartment 11 of the housing 10 for gripping or grasping or holding or retaining the inflation valve 90 to the sliding member 30 and the housing 10. The gripping device 5 includes another sliding member or casing 50 slidably received or engaged in the lower portion 13 of the compartment 11 of the housing 10 and having two casing members 51, 52, or formed by two casing members 51, 52, and the casing 50 includes a non-circular cross section (FIG. 1), such as a square or rectangular cross section for slidably engaging with the corresponding non-circular tilted inner peripheral surface 22 in the lower portion 13 of the compartment 11 of the housing 10, and includes an opening or orifice or aperture or passage 53 formed in the casing members 51, 52 for partially receiving or engaging with the tube 37 of the sliding member 30 (FIGS. 4, 5) and for anchoring or securing or retaining or positioning the casing 50 to the sliding member 30 and the housing 10. The sealing ring 40 is engaged between the tube 37 of the sliding member 30 and the casing members 51, 52 of the casing 50.

Figure 1:
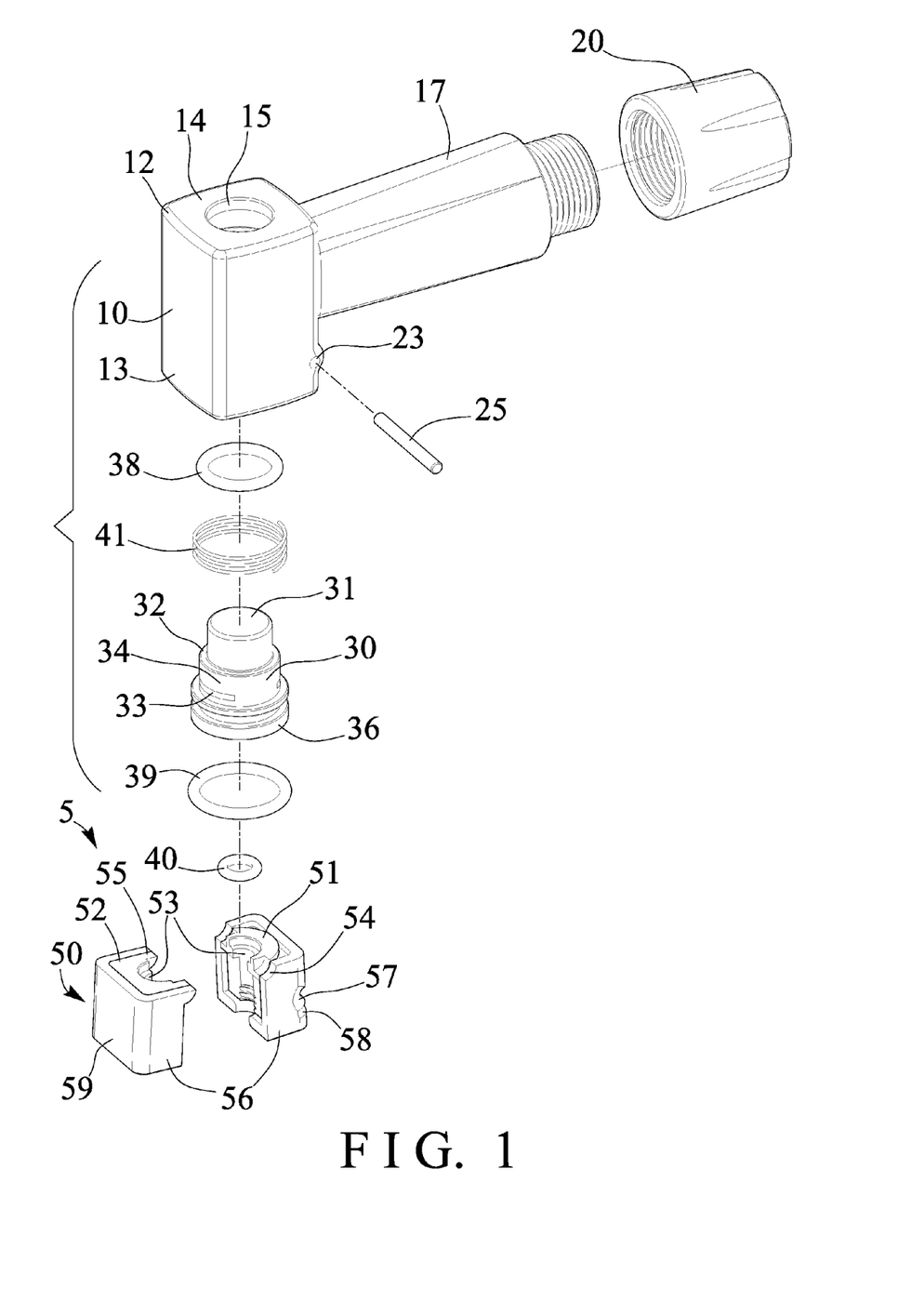
FIG. 1 is an exploded view of an air valve connecting device or attachment in accordance with the present invention.
Figure 2:
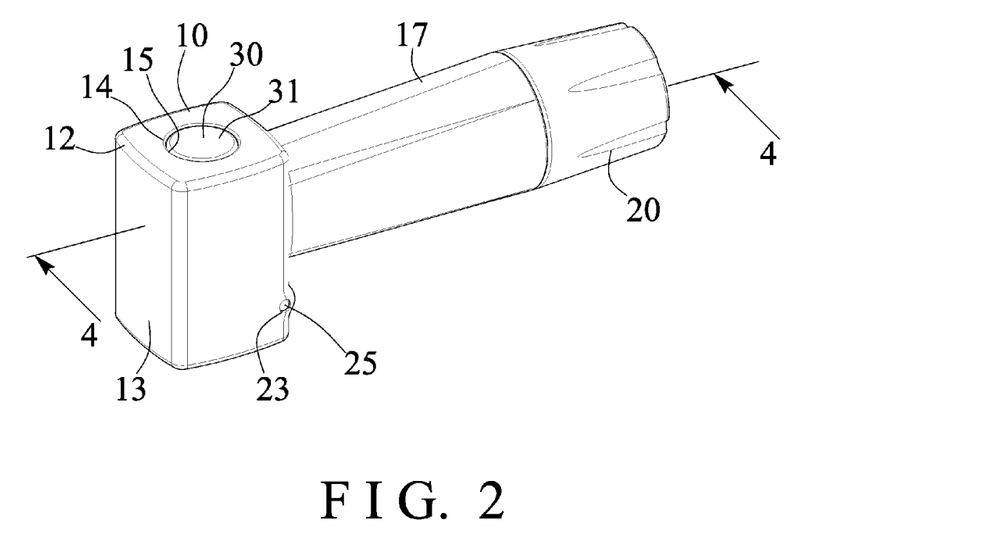
FIG. 2 is a perspective view of the air valve connecting device or attachment.
Figure 3:
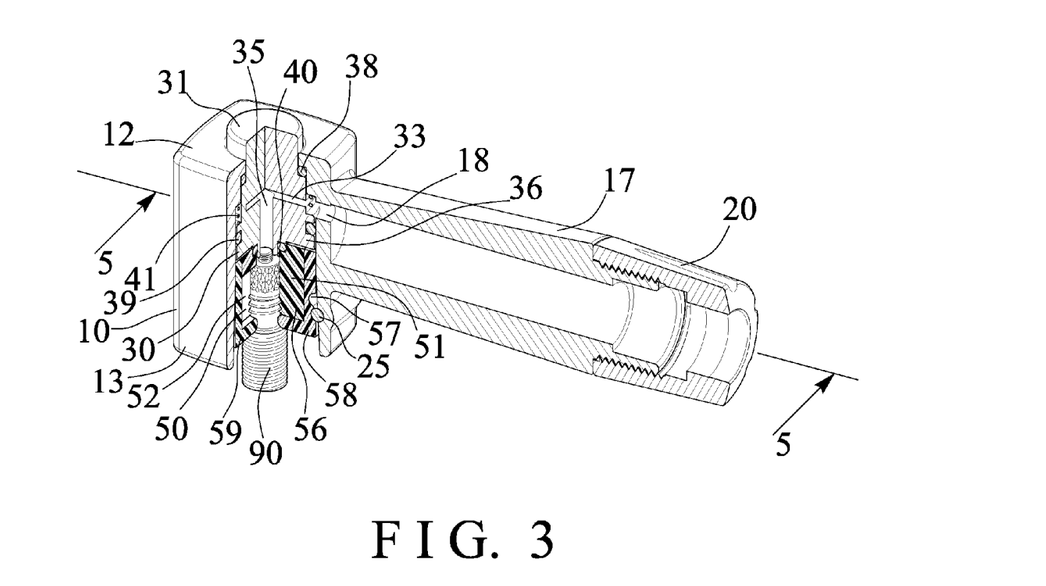
FIG. 3 is another perspective view of the air valve connecting device or attachment, in which a portion of the attachment has been cut off for showing the inner structure of the attachment.
Figure 4:
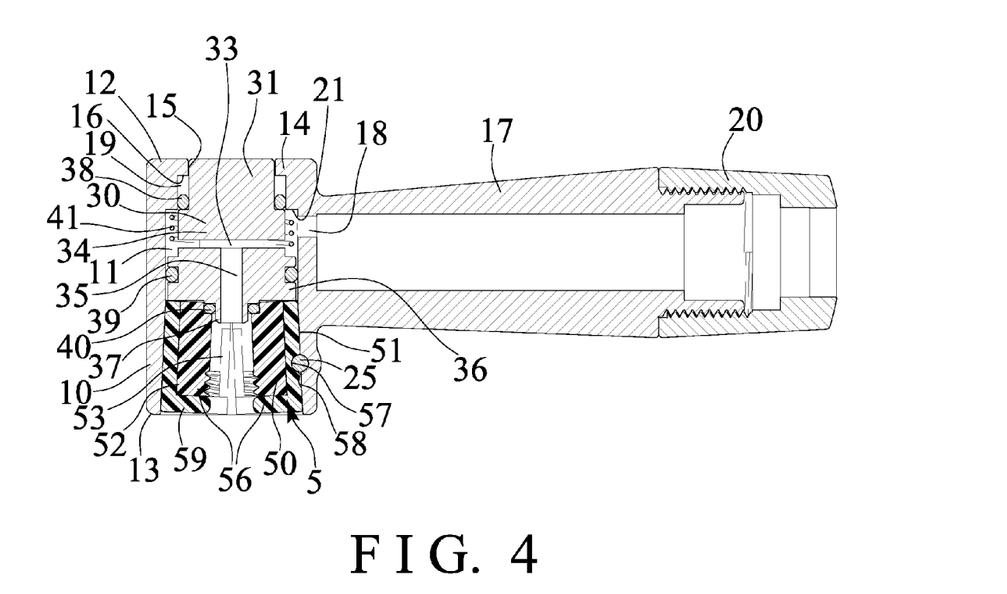
FIG. 4 is a cross sectional view of the air valve connecting device or attachment taken along lines 4-4 of FIG. 2.
Figure 5:
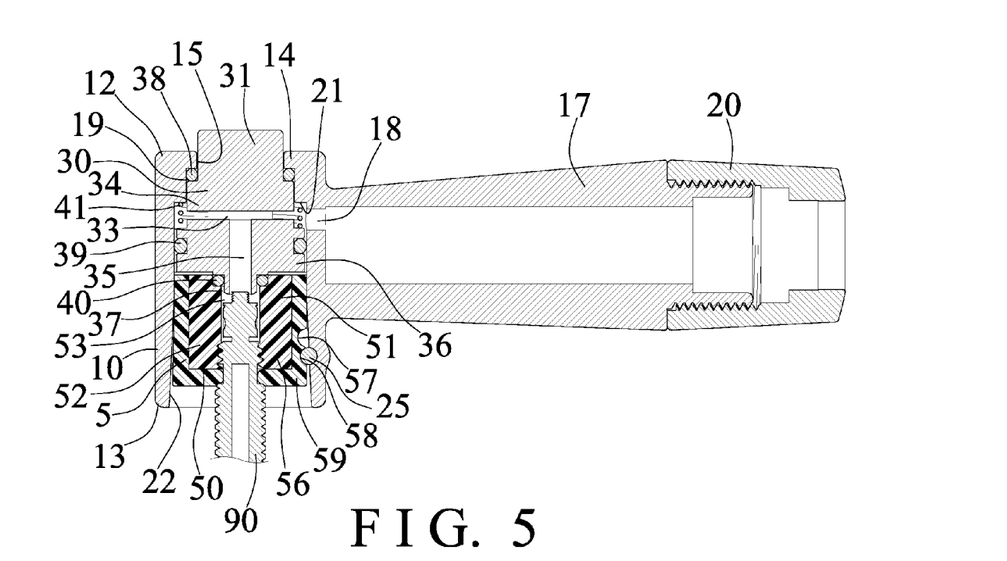
FIG. 5 is another cross sectional view similar to FIG. 4, taken along lines 5-5 of FIG. 3, illustrating the operation of the air valve connecting device or attachment.
Figure 6:
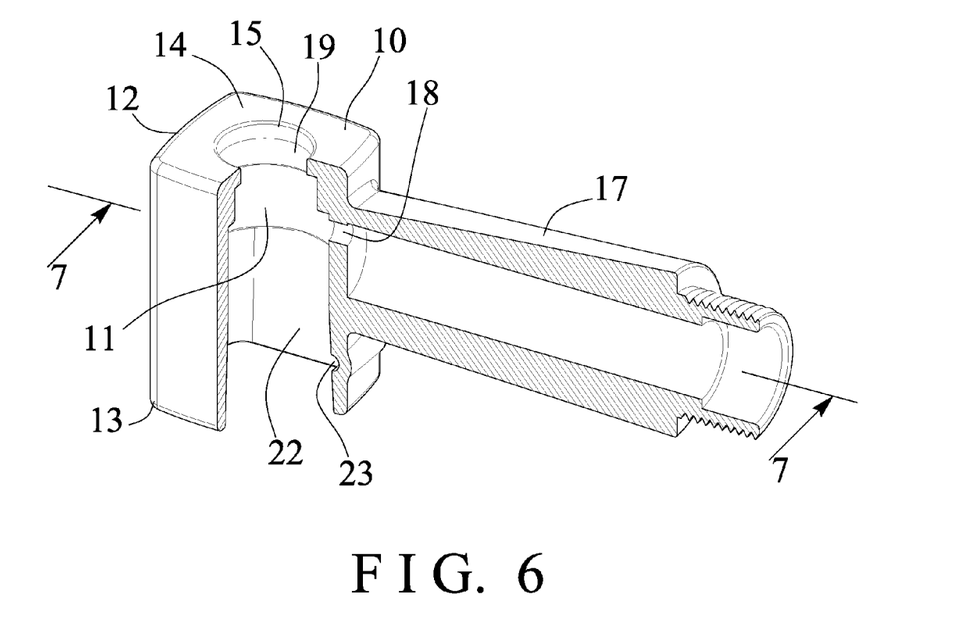
FIG. 6 is a further perspective view, illustrating the outer housing of the air valve connecting device or attachment, in which a portion of the outer housing has been cut off for showing the inner structure of the outer housing.

One of the casing members 51 includes a notch or recess or depression 54 formed in the upper portion thereof (FIG. 1), and the other casing member 52 includes a rod or shaft 55 extended laterally from the upper portion thereof and pivotally or rotatably engaged with the depression 54 of the casing member 51 for pivotally or rotatably anchoring or retaining or securing or coupling the casing members 51, 52 of the casing 50 together, and the casing members 51, 52 of the casing 50 include a lower or bottom portion 56 slightly movable away from each other (FIG. 4) when the casing 50 is moved downwardly relative to the housing 10, for selectively receiving or engaging with the inflation valve 90, or for allowing the inflation valve 90 to be selectively engaged into the passage 53 of the casing members 51, 52 of the casing 50 (FIGS. 3, 5). When the inflation valve 90 is engaged into the passage 53 of the casing members 51, 52 of the casing 50, the inflation valve 90 may push and force and move the casing 50 and the sliding member 30 into the housing 10 and onto the spring biasing member 41, and may push and force the upper portion 31 of the sliding member 30 to move out of the orifice 15 of the housing 10.

As shown in FIG. 5, when the casing members 51, 52 of the casing 50 are moved into the housing 10, the tilted inner peripheral surface 22 of the housing 10 may force the lower or bottom portion 56 of the casing members 51, 52 to move toward each other and to grip or grasp or hold or retain the inflation valve 90 to the gripping device 5 and the sliding member 30. One of the casing members 51 further includes one or more (such as two) recesses or depressions or notches 57, 58 formed therein and located or faced or directed toward the through hole 23 of the housing 10 for selectively receiving or engaging with the latch member 25. For example, as shown in FIG. 4, when the casing 50 is moved downwardly relative to the housing 10, the latch member 25 may be engaged with the upper notch 57 of the casing 50 for anchoring or retaining or securing the lower or bottom portion 56 of the casing members 51, 52 at the separated position.

On the contrary, as shown in FIGS. 3 and 5, when the casing 50 is moved into the housing 10, the latch member 25 may be engaged with the lower notch 58 of the casing 50 for anchoring or retaining or securing the inflation valve 90 in the casing members 51, 52 of the casing 50. As shown in FIGS. 1 and 3-5, the casing members 51, 52 of the casing 50 each may include a soft or resilient outer peripheral member or wall 59 for increasing the resilience of the casing members 51, 52 of the casing 50 and for allowing the latch member 25 to be selectively engaged with either of the notches 57, 58 of the casing member 51 of the casing 50; and/or for allowing the inflation valve 90 to be resiliently gripped or grasped or held or retained in the casing members 51, 52 of the casing 50.

Figure 8:
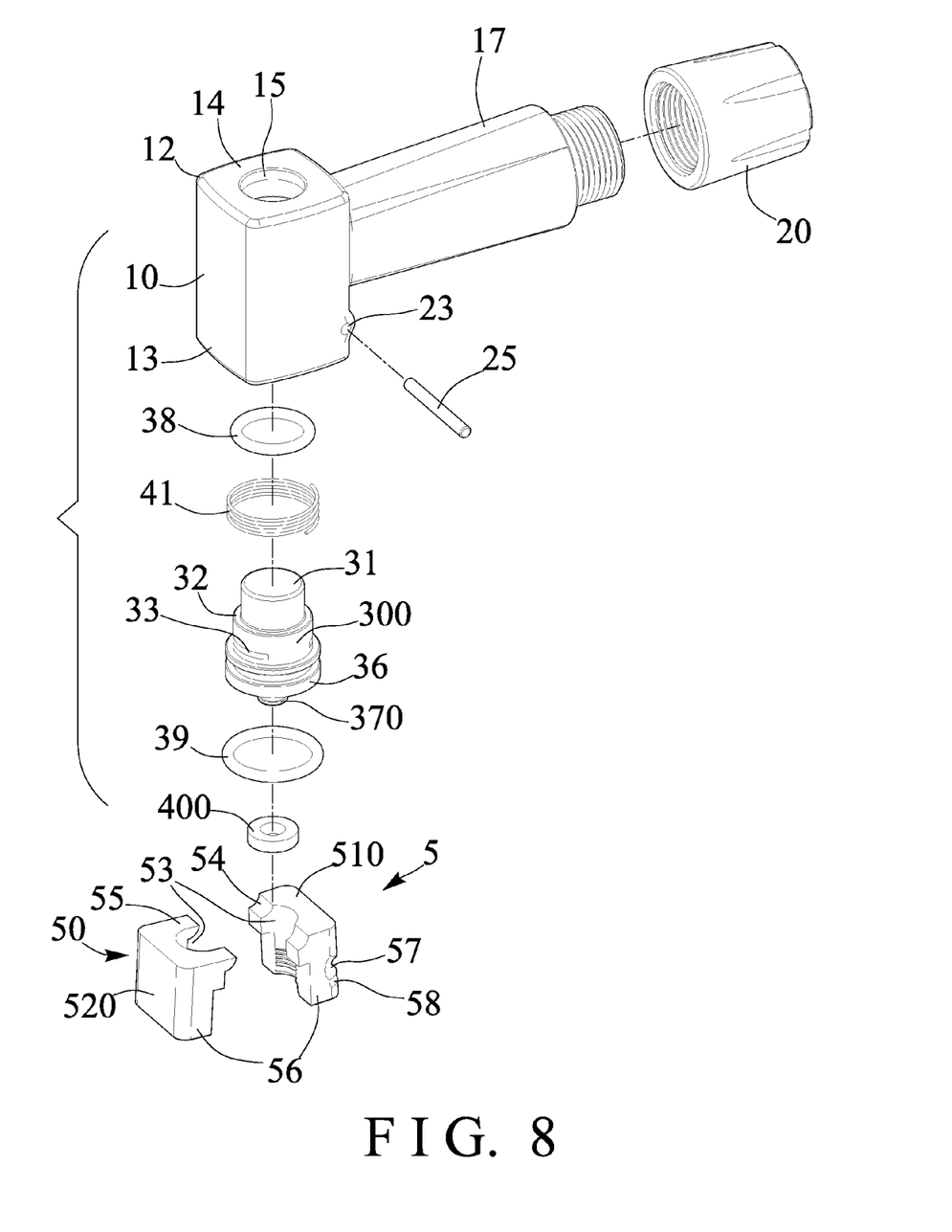
FIG. 8 is another exploded view illustrating the other arrangement of the air valve connecting device or attachment for engaging with the different or other inflation valve.
Figure 9:
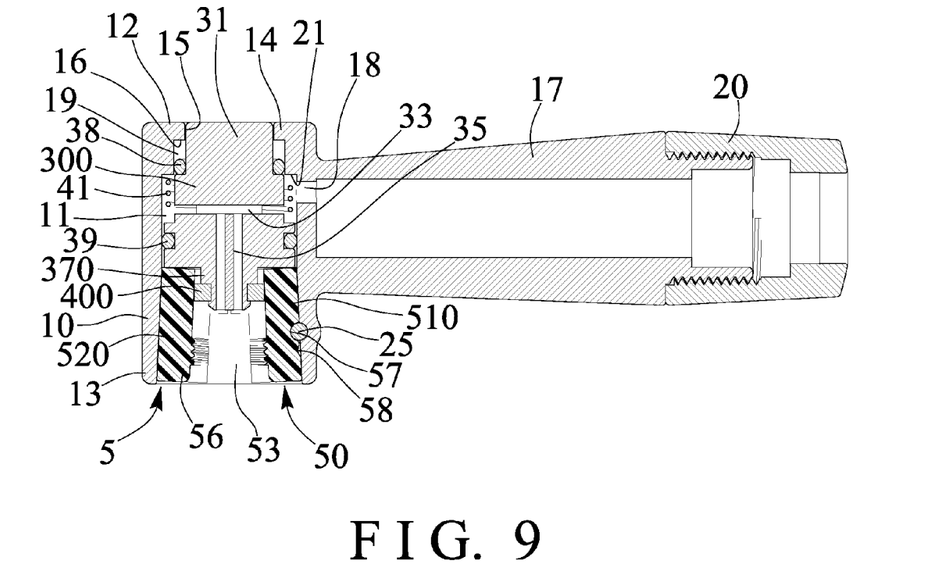
FIGS. 9 and 10 are still further cross sectional views illustrating the operation of the other arrangement of the air valve connecting device or attachment as shown in FIG. 8.
Figure 10:
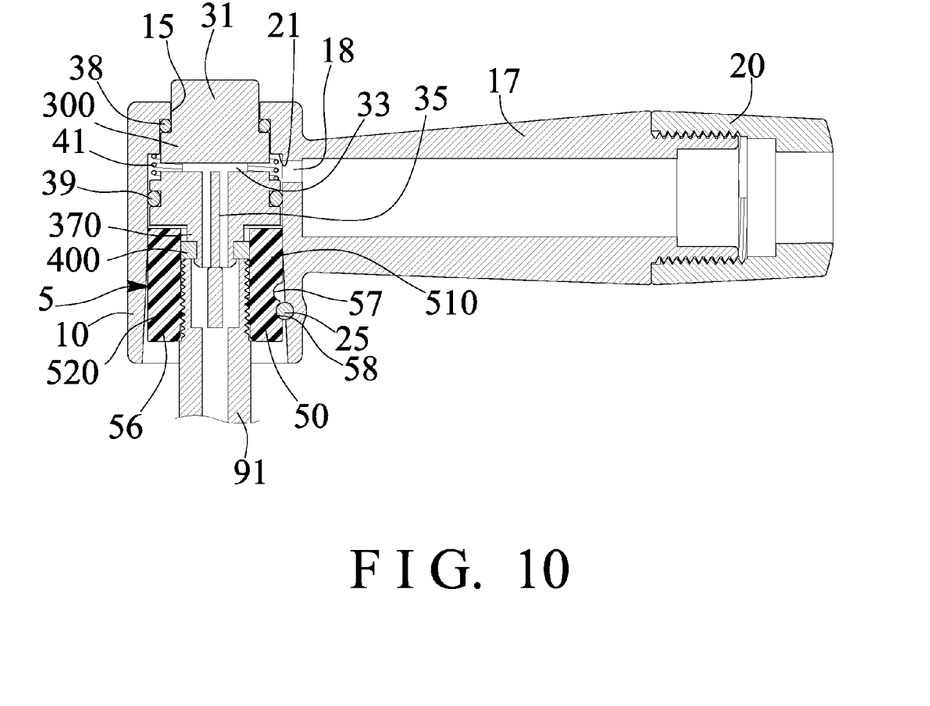

As shown in FIGS. 8-10, for gripping or grasping or holding or retaining the other inflation valve 91 (FIG. 10), such as the French type or the U.S. type valve or second inflation valve 91 or the like, the tube 370 of the sliding member 300 may include a different size or shape from that shown in FIGS. 1 and 3-5, for selectively engaging with a different sealing ring 400, and the casing members 510, 520 of the casing 50 may include a different size or shape from that shown in FIGS. 1 and 3-5, for selectively engaging with the different or other inflation valve 91, such as the U.S. type valve or second inflation valve 91. It is to be noted that the air valve connecting device or attachment in accordance with the invention may include a sliding member 30 and a pair of casing members 51, 52 for engaging with the French type inflation valve 90, and may include another sliding member 300 and a pair of casing members 510, 520 for engaging with the different or other or U.S. type inflation valve 91.

In operation, as shown in FIGS. 4 and 9, the spring biasing member 41 may normally bias and force or move the sliding member 30 outwardly and downwardly toward the lower portion 13 of the housing 10, to have the lower or bottom portion 56 of the casing members 51, 52 of the casing 50 to be slightly moved away from each other at the separated position, for allowing the inflation valve 90, 91 to be engaged into the passage 53 of the casing members 51, 52 of the casing 50, the inflation valve 90, 91 may push and force and move the casing 50 and the sliding member 30 into the housing 10 and onto the spring biasing member 41, and may force the casing members 51, 52 of the casing 50 to move toward each other and to grip or grasp or hold or retain the inflation valve 90, 91 to the gripping device 5 and the sliding member 30 (FIGS. 3, 5, 10). After the air pumping operation, the upper portion 31 of the sliding member 30 may be depressed or forced to engage into the compartment 11 of the housing 10, in order to move the inflation valve 90, 91 out of the housing 10 and the casing 50; or the housing 10 may be pulled away from the inflation valve 90, 91 to have the inflation valve 90, 91 to be separated or disengaged from the housing 10 and the casing 50.

It is to be noted that the user may use only one of his hands to hold the housing 10 and to have the inflation valve 90, 91 to be easily and quickly engaged into the passage 53 of the casing members 51, 52 of the casing 50, and may easily and quickly push and force and move the inflation valve 90 and the casing 50 and the sliding member 30 into the housing 10 and onto the spring biasing member 41, and to have the inflation valve 90, 91 to be gripped or grasped or held or retained to or by the casing members 51, 52 of the casing 50 of the gripping device 5 and the sliding member 30. Alternatively, the user may also push and force the upper portion 31 of the sliding member 30 to move into the orifice 15 of the housing 10 and to move the sliding member 30 and the casing members 51, 52 of the casing 50 outwardly and downwardly toward the lower portion 13 of the housing 10, and to have the lower or bottom portion 56 of the casing members 51, 52 of the casing 50 to be slightly moved away from each other at the separated position, and for allowing the inflation valve 90, 91 to be easily engaged into the passage 53 of the casing members 51, 52 of the casing 50.

Accordingly, the air valve connecting device or attachment in accordance with the invention includes an improved structure for easily and quickly connecting an inflation valve by the user and for preventing an air leaking from the inflation valves and the attachment, and includes different sliding members and different casings for engaging with different inflation valves.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
    a housing including a compartment formed therein, and including an entrance formed therein and communicating with said compartment of said housing for receiving a pressurized air, and including an inner peripheral surface formed in a lower portion of said housing,
    a sliding member slidably received and engaged in said compartment of said housing, and including an upper portion extendible out of said housing, said sliding member including a pathway formed therein and communicating with said entrance of said housing for receiving the pressurized air from said entrance of said housing, said sliding member including a lower portion,
    a gripping device including a casing having two casing members moved in concert with said sliding member and slidably engaged with said inner peripheral surface in said lower portion of said housing, said casing including a passage formed in said casing members, and
    an inflation valve engageable into said passage of said casing members of said casing for selectively moving said casing into said compartment of said housing and for allowing said casing members of said casing to be forced toward each other with said inner peripheral surface of said housing, wherein
    said housing includes a spring biasing member disposed in said compartment of said housing and engaged between said sliding member and said housing for biasing and moving said sliding member outwardly toward said lower portion of said housing.

2. The air valve connecting device as claimed in claim 1, wherein said housing includes a hole formed through said housing and communicating with said compartment of said housing, and a latch member engaged in said hole of said housing for engaging with said casing and for anchoring and securing said casing to said housing.

3. The air valve connecting device as claimed in claim 1, wherein said casing members of said casing each include a resilient outer peripheral wall for increasing a resilience of said casing members of said casing.

4. The air valve connecting device as claimed in claim 1, wherein said sliding member includes a tube provided in said lower portion of said sliding member and engaged into said passage of said casing for anchoring said casing to said sliding member.

5. The air valve connecting device as claimed in claim 1, wherein said housing includes an orifice and an inner peripheral shoulder formed in said upper portion of said housing and communicating with said compartment of said housing, and said sliding member includes an upper portion extendible out through said orifice of said housing.

6. An air valve connecting device comprising:
    a housing including a compartment formed therein, and including an entrance formed therein and communicating with said compartment of said housing for receiving a pressurized air, and including an inner peripheral surface formed in a lower portion of said housing,
    a sliding member slidably received and engaged in said compartment of said housing, and including an upper portion extendible out of said housing, said sliding member including a pathway formed therein and communicating with said entrance of said housing for receiving the pressurized air from said entrance of said housing, said sliding member including a lower portion,
    a gripping device including a casing having two casing members moved in concert with said sliding member and slidably engaged with said inner peripheral surface in said lower portion of said housing, said casing including a passage formed in said casing members, and
    an inflation valve engageable into said passage of said casing members of said casing for selectively moving said casing into said compartment of said housing and for allowing said casing members of said casing to be forced toward each other with said inner peripheral surface of said housing, wherein
    said gripping device includes a shaft extended from one of said casing members and pivotally engaged with the other casing member for pivotally coupling said casing members of said casing together.

7. The air valve connecting device as claimed in claim 6, wherein said gripping device includes a depression formed in other casing member for engaging with said shaft.

8. An air valve connecting device comprising:
    a housing including a compartment formed therein, and including an entrance formed therein and communicating with said compartment of said housing for receiving a pressurized air, and including an inner peripheral surface formed in a lower portion of said housing, said housing including a hole formed through said housing and communicating with said compartment of said housing,
    a sliding member slidably received and engaged in said compartment of said housing, and including an upper portion extendible out of said housing, said sliding member including a pathway formed therein and communicating with said entrance of said housing for receiving the pressurized air from said entrance of said housing, said sliding member including a lower portion,
    a gripping device including a casing having two casing members moved in concert with said sliding member and slidably engaged with said inner peripheral surface in said lower portion of said housing, said casing including a passage formed in said casing members,
    a latch member engaged in said hole of said housing for engaging with said casing and for anchoring and securing said casing to said housing, and
    an inflation valve engageable into said passage of said casing members of said casing for selectively moving said casing into said compartment of said housing and for allowing said casing members of said casing to be forced toward each other with said inner peripheral surface of said housing, wherein
    one of said casing members includes a first notch and a second notch formed therein and directed toward said hole of said housing for selectively engaging with said latch member.

9. An air valve connecting device comprising:
    a housing including a compartment formed therein, and including an entrance formed therein and communicating with said compartment of said housing for receiving a pressurized air, and including an inner peripheral surface formed in a lower portion of said housing,
    a sliding member slidably received and engaged in said compartment of said housing, and including an upper portion extendible out of said housing, said sliding member including a pathway formed therein and communicating with said entrance of said housing for receiving the pressurized air from said entrance of said housing, said sliding member including a lower portion,
    a gripping device including a casing having two casing members moved in concert with said sliding member and slidably engaged with said inner peripheral surface in said lower portion of said housing, said casing including a passage formed in said casing members, said sliding member including a tube provided in said lower portion of said sliding member and engaged into said passage of said casing for anchoring said casing to said sliding member, and an inflation valve engageable into said passage of said casing members of said casing for selectively moving said casing into said compartment of said housing and for allowing said casing members of said casing to be forced toward each other with said inner peripheral surface of said housing, wherein a sealing ring is engaged between said tube of said sliding member and said casing.

* * * * *